Jan. 31, 1928.  1,657,561

E. L. ACKERMAN ET AL
CLUTCH DEVICE
Filed March 26, 1927

INVENTORS
EDWARD L. ACKERMAN
ALOIS J. ZWIERZINA
BY
ATTORNEY.

Patented Jan. 31, 1928.

1,657,561

UNITED STATES PATENT OFFICE.

EDWARD L. ACKERMAN AND ALOIS J. ZWIERZINA, OF DETROIT, MICHIGAN, ASSIGNORS TO ACKERMAN-BLAESSER-FEZZEY, INC., OF DETROIT, MICHIGAN, A CORPORATION OF MICHIGAN.

CLUTCH DEVICE.

Application filed March 26, 1927. Serial No. 178,667.

This invention relates to clutch devices, and the object of the invention is to provide a simple and comparatively inexpensive clutch device for use with various mechanisms but more particularly sash operating mechanism the purpose being to provide a clutch device by rotation of which a window sash may be raised or lowered, and that upon release of the operating handle the weight of the sash actuates the clutch to prevent movement of the operating mechanism and thereby holds the sash in position to be released only by rotation of the handle in one direction or the other.

It is, of course, to be understood that the invention may be used in connecting two parts and automatically releasing one of the parts when the other part is actuated. These and other various objects and novel features of the invention are hereinafter more fully described and claimed, and the preferred form of construction of a clutch device embodying our invention is shown in the accompanying drawings in which—

Figure 6:
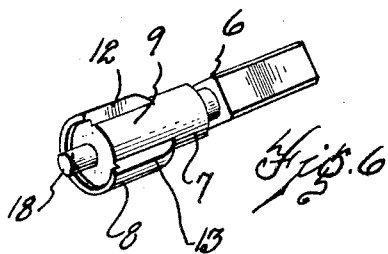
Fig. 6 is a perspective view of the driving member.
Figure 7:
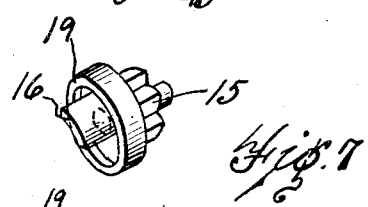
Fig. 7 is a perspective view of the driving gear showing its spring engaging lug.

As previously stated, this device is applicable for use with various structures under which its general design may vary. In its application in such operating mechanism it preferably consists of a casing 1 having a flange 2 with apertured portions for attaching to the cross bar 3 of the recess in an automobile body into and out of which the sash 4 is to be moved. This casing 1 is of cylindrical form of body and has an extension 5 at one end in which the driving member 6 is rotatably mounted, the driver 6 being provided with a cylindrical portion 7 fitting the extension 5 of the case. Within the body of the casing the driving member is of an increased diameter as indicated at 8 in Fig. 6 and this portion of increased diameter extends only part way about the forward end of the driver there being a space or channel at 9 in Fig. 6, the bottom of which is coextensive with the surface of the portion 7 thereof. The outer end of the driver 6 is squared for the application of a handle member or crank (not here shown) by means of which it may be rotated.

Figure 1:
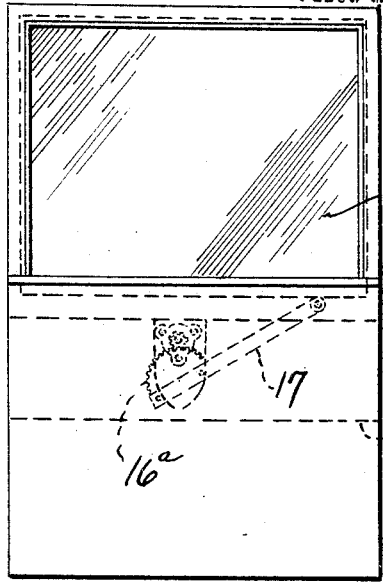
Fig. 1 is an elevation showing the application of the device of the sash operating mechanism.
Figure 3:
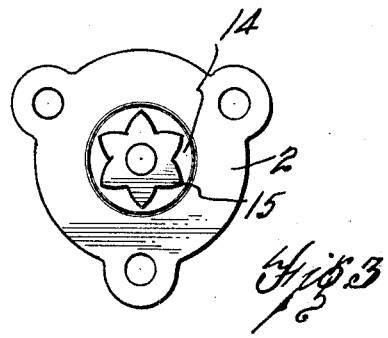
Fig. 3 is an end view showing the driving gear.
Figure 4:
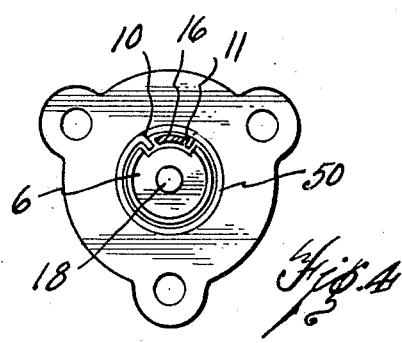
Fig. 4 is a similar view with the driving gear removed but showing the lug of the gear in its relationship with the driving member and the coiled spring.
Figure 5:
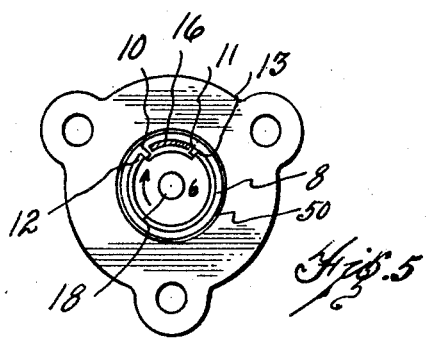
Fig. 5 is a similar view showing the position of the parts when pressure is applied to the clutch spring by the gear lug.
Figure 2:
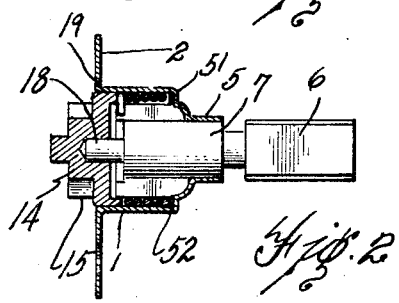
Fig. 2 is a longitudinal section of the clutch device.

In the barrel or body 1 is a cylindrical coiled spring 50 the opposite ends of which are inturned as indicated at 10 and 11 in Figs. 4 and 5 to engage over the edges 12 and 13 of the portion 8 of the driving member 6 by which this channel 9 is defined. This coiled spring is approximately of the same diameter as the barrel in which it rides. It will be observed from Fig. 5 that rotation of this member 6 in either direction would tend to contract the spring by reason of engagement of that edge 12 for instance with the inturned edge 10 of the spring or if rotated in the opposite direction by engagement of the edge 13 with the inturned end 11 of the spring and therefore that the member 6 by rotation in either direction releases the clutch.

A component part of this mechanism is the member 14 here shown as having a gear 15 for the purpose of engaging the segmental gear 16ª attached to the operating lever 17 by means of which the sash may be operated. This member 14 is to be understood as having connection with the member to be moved and it is to be understood that this is not restricted to the gear form of connection here shown but an essential characteristic of this member in any form in which it may be made is the provision of the lug 16 on its inner end which extends into the space 9 between the edges 12 and 13 of the driving member but is somewhat less in width than the distance between spring ends as will be observed from Figs. 4 and 5. Preferably also the end of the driver 6 is provided with an extension 18 entering a hollow recess therefor in the member 14 serving to center the said member and provide a support for the inner end of the driver 6. For this purpose it will be observed that the member 14 is provided with a peripheral flange 19 which extends into the end of the hollow body 1 and thus provides a proper support for the extension 18 of the driving member.

The operation of this device is of the most simple character. As previously stated, the driving member is free to be turned at any time as the turning thereof causes the spring to be contracted thus releasing its frictional engagement with the stationary casing in which it is mounted, and by such rotation the member 14 is turned due to the fact of the lug 16 lying in the channel 9 and between the inturned ends of the spring member. Upon release of the driving member permitting the weight of the sash for instance, if the device be used in a sash operating mechanism, the weight of the sash tends to rotate the member 14 and this rotation of the gear will cause the lug to engage an end of the spring and tend to expand the said spring to tight engagement of the coils thereof with the stationary barrel and thus holding the sash or the member operated in its adjusted position. The tendency of the member 14 to be rotated therefore causes the clutch spring to bind in the barrel and rotation of the driver member 6 contracts the spring releasing it from material frictional engagement with the barrel and turns the member 14 and actuates the part that may be connected therewith.

Preferably the casing 1 is provided with an annular shoulder 51 and a washer 52 encircles the enlarged portion 8 of the driver and seats against the shoulder 51. This washer provides a seat for the end of the coiled spring 50. The driver is somewhat loosely mounted in this part of the casing and a spring may tend to creep in between the inner end of the enlarged portion 8 and the casing and the washer is introduced to prevent such possible action of the spring which would otherwise tend to bind and produce noise in operation of the device.

Having thus briefly described our invention, its mode of operation and utility, what we claim and desire to secure by Letters Patent of the United States is—

1. A clutch device consisting of three members, two of which are rotatable relative to the third and arranged to permit a limited relative rotative movement on the same axis, a coiled spring between the rotable members and the third member for frictionally engaging the third member, said spring having its opposite ends bent for positive engagement with the rotatable members, one of the said rotative members having an integral lug extending between the bent ends of the spring whereby the pressure against either of the said bent ends through turning of the said member causes frictional engagement between the spring and the third member preventing rotation of the said rotatable members, the other rotatable member having a longitudinal channel in its surface to receive the ends of the springs and the lug of the first rotative member and rotation of said other rotatable member contracting the spring and releasing the same from frictional engagement with the third member and driving the first rotatable member through engagement with its lug, one rotative member having an extension and the other rotative member having a recess to receive and support the same on the axis of the third member.

2. In a clutch device, a stationary hollow shell, two rotatable members supported by the shell, said two rotatable members having limited relative rotatable movement, one of said members having an enlarged portion within the hollow shell formed with a groove providing spaced edges approximately on a radial line thereof, a cylindrical coiled spring member within which the said grooved member is positioned, each end of the spring having an inturned bent end engaging over the respective edges and in spaced relation, the other of said members having a lug extending into the groove between the said bent ends of the spring and in spaced relation therewith whereby on the turning of the second member the spring is expanded to frictional engagement with the stationary shell and on rotative movement of the other rotatable member the spring is contracted and freed from material frictional engagement with the shell.

3. In a clutch device, a stationarily mounted hollow shell, a driving member extending thereinto having a groove in its surface providing edges whose faces lie approximately on a radial line thereof, the diameter of the driving member being less than the diameter of the shell, said shell being formed at one of its ends to rotatively support the driving member intermediate its ends, a cylindrical projection on the inner end of the driving member, a second member apertured to receive the said projection and having a body lying in the shell and providing a supporting bearing for the inner end of the driving member, a cylindrical spring in the space between the driving member and the shell, the opposite ends of which are inturned to engage over the said edges of the groove in the driving member, a lug on the second member lying in the said groove and between the inturned bent ends, the parts being so arranged that through rotation of the second member relative to the first member the spring is expanded to frictional contact with the shell and by rotation of the first member relative to the second the spring is contracted to permit a comparatively free rotation of the first member, the lug providing a means whereby rotation of the first member rotates the second member, a gear on the second member, and a gear segment in mesh therewith.

4. In a clutch device, a stationary hollow shell, a driving member extending thereinto having a groove in its surface providing edges whose faces lie approximately on a radial line thereof, the diameter of the driving member being less than the diameter of the shell, said shell at one end having an extension of less diameter and the driving member having a portion rotatably supported therein, a second member rotatably supported in the shell and providing a support for the contiguous end of the driving member, a cylindrical spring between the driving member and the shell, the opposite ends of which are inturned to engage over the edges of the groove of the said driving member, the said shell adjacent the cylindrical extension having a shoulder, a loose washer on the driving member engaging the shoulder and providing an abutment for the adjacent end of the coiled spring, the driving member and said second member being mounted to permit a relative rotative movement and so arranged that pressure applied to turn the second member expands the spring to frictional engagement with the shell and rotation of the driving member contracts the spring releasing the same from the shell and driving the second member.

In testimony whereof, we sign this specification.

EDWARD L. ACKERMAN.
ALOIS J. ZWIERZINA.